United States Patent
De Thoury

(10) Patent No.: US 10,955,317 B2
(45) Date of Patent: Mar. 23, 2021

(54) REMOVABLE CASSETTE FOR AN APPARATUS FOR SAMPLING NANOPARTICLES PRESENT IN AN AEROSOL, AND FILTRATION ASSEMBLY FOR SUCH A CASSETTE

(71) Applicant: PARTICLEVER, Paris (FR)

(72) Inventor: Raphaël De Thoury, Croissy-Beaubourg (FR)

(73) Assignee: PARTICLEVER, Paris (FR)

(*) Notice: Subject to any disclaimer, the term of this patent is extended or adjusted under 35 U.S.C. 154(b) by 235 days.

(21) Appl. No.: 16/092,315

(22) PCT Filed: May 9, 2017

(86) PCT No.: PCT/EP2017/061060
§ 371 (c)(1),
(2) Date: Oct. 9, 2018

(87) PCT Pub. No.: WO2017/194541
PCT Pub. Date: Nov. 16, 2017

(65) Prior Publication Data
US 2019/0145865 A1    May 16, 2019

(30) Foreign Application Priority Data
May 13, 2016 (FR) .................................. 1654316

(51) Int. Cl.
*G01N 1/22* (2006.01)
*B01D 63/08* (2006.01)
(Continued)

(52) U.S. Cl.
CPC ........... *G01N 1/2205* (2013.01); *B01D 53/22* (2013.01); *B01D 63/087* (2013.01); *B01D 69/10* (2013.01);
(Continued)

(58) Field of Classification Search
CPC .. B01D 46/0005; B01D 53/22; B01D 63/087; B01D 69/10; G01N 1/22; G01N 1/2205;
(Continued)

(56) References Cited

U.S. PATENT DOCUMENTS

| 4,148,732 A | 4/1979 | Burrow et al. |
| 6,033,455 A | 3/2000 | Kurashima |

(Continued)

FOREIGN PATENT DOCUMENTS

| EP | 0 692 294 A1 | 1/1996 |
| EP | 0 982 062 A2 | 3/2000 |

(Continued)

OTHER PUBLICATIONS

International Search Report of PCT/EP2017/061060 dated Aug. 11, 2017 [PCT/ISA/210].

*Primary Examiner* — Jason M Greene
(74) *Attorney, Agent, or Firm* — Sughrue Mion, PLLC

(57) ABSTRACT

The invention relates to a filtration assembly (5) comprising an annular support (12) which comprises an annular step (13) having an apex on which a filter membrane (11) rests, and a cover (20) covering the annular support in order to hold a periphery of the membrane between the cover and the annular support. The cover comprises a ring (21) which fits around the step to trap the periphery of the membrane between the ring and the annular support, the ring being extended by a skirt (22) which extends as a projection from the ring to cover an external peripheral wall of the annular support and to exhibit an end face (23) which extends in continuity with a bearing face (24) of the annular support. The invention also relates to a removable cassette for an apparatus for sampling nanoparticles comprising such a filtration assembly.

9 Claims, 2 Drawing Sheets

(51) Int. Cl.
B01D 69/10 (2006.01)
B01D 53/22 (2006.01)

(52) U.S. Cl.
CPC ..... *G01N 1/2273* (2013.01); *G01N 2001/227* (2013.01); *G01N 2001/2276* (2013.01); *G01N 2001/2288* (2013.01)

(58) Field of Classification Search
CPC .......... G01N 1/2273; G01N 2001/227; G01N 2001/2276; G01N 2001/2288
See application file for complete search history.

(56) References Cited

U.S. PATENT DOCUMENTS

| | | | | |
|---|---|---|---|---|
| 6,131,573 | A | * | 10/2000 | Brown ................... A61B 5/097 128/202.28 |
| 2014/0286836 | A1 | * | 9/2014 | Clavaguera .......... G01N 1/2205 422/535 |
| 2015/0251119 | A1 | * | 9/2015 | Clavaguera ........ B01D 46/0005 378/44 |
| 2017/0097287 | A1 | * | 4/2017 | Clavaguera .......... G01N 1/2205 |

FOREIGN PATENT DOCUMENTS

| | | |
|---|---|---|
| FR | 2 992 227 A1 | 12/2013 |
| FR | 3 022 025 B1 | 3/2018 |

\* cited by examiner

REMOVABLE CASSETTE FOR AN APPARATUS FOR SAMPLING NANOPARTICLES PRESENT IN AN AEROSOL, AND FILTRATION ASSEMBLY FOR SUCH A CASSETTE

CROSS REFERENCE TO RELATED APPLICATIONS

This application is a National Stage of International Application No. PCT/EP2017/061060, filed May 9, 2017, claiming priority based on French Patent Application No. 1654316, filed May 13, 2016.

The invention relates to a removable cassette for an apparatus for sampling nanoparticles present in an aerosol, and to a filtration assembly for such a cassette.

BACKGROUND OF THE INVENTION

Document FR3022025 discloses a nanoparticles-sampling apparatus equipped with means for sucking in an aerosol, and to which there is attached a removable cassette that forms a tunnel with an inlet open to the outside and an outlet that can be fitted with a fluidtight seal to a suction inlet of the sampling device. The tunnel is barred by a filtration assembly such that the aerosol drawn in by the tunnel passes through the filter of the filtration assembly. This filter halts and retains the nanoparticles of the sucked-in aerosol that passes through the tunnel.

The removable cassette comprises a base comprising means of attachment to the sampling apparatus, and a cap attached to the base to trap the filtration assembly between the base and the cap. The filtration assembly comprises an annular support formed as one material with the filter itself. The tunnel is sealed by a flat seal interposed between the annular support and the base.

For industrialization reasons it is envisioned to use a filtration assembly like the one illustrated in document FR2992227. That filtration assembly comprises a filter membrane borne by an annular support comprising a peripheral step on the apex of which the filter membrane rests. The annular support is covered by a ring that can be slipped around the step to sandwich the periphery of the filter between the ring and the support and thus pull the membrane taut so that it exhibits a planar wall suitable for analysis purposes.

It is important to ensure that no passage is able to form a bypass allowing the sucked-in aerosol to avoid passing through the filter, or allowing it to pass through the filter but without coming from the entry to the tunnel, for example by slipping in through a passage between the base and the cap of the cassette.

SUBJECT OF THE INVENTION

It is an object of the present invention to propose a particular layout of the constituent components of the removable cassette that improves the efficiency and reliability of the sample taking and makes the filtration assembly easier to handle.

DESCRIPTION OF THE INVENTION

In order to achieve this objective the invention first of all proposes a filtration assembly for halting and retaining nanoparticles in suspension in an aerosol passing through the filtration assembly, the filtration assembly comprising an annular support which comprises an annular step having an apex on which a filter membrane rests, and a cover covering the annular support to hold a periphery of the membrane between the cover and the annular support. According to the invention, the cover comprises a ring that can be slipped around the step to sandwich the periphery of the membrane between the ring and the annular support, the ring being extended by a skirt which projects out from the ring to cover an external peripheral wall of the annular support and to have an end face which extends in continuity with a bearing face of the annular support.

The skirt performs a number of functions:
  it helps to seal the cassette. Specifically, before such a filtration assembly is placed in a removable cassette so that it can be sandwiched between the base and the cap of the cassette, all that is required is to fit a first seal that extends simultaneously against said faces in order to close off a first passage between the annular support and the cover, thereby preventing the aerosol sucked in via the tunnel from bypassing the filter membrane, whereas a second seal positioned between the cap and the cover to close off a second passage between the base and the cap prevents any aerosol that may be sucked up by a passage between the base and the cap from combining with the aerosol sucked in via the tunnel;
  it makes the filtration assembly easier to handle. Specifically, the filtration assembly can be grasped via the peripheral external face of the skirt, for example using grippers.

For preference, the skirt and the ring of the cover are formed as one material.

The invention also relates to a removable cassette for an apparatus for sampling nanoparticles, the cassette comprising:
  a base comprising means for securing it to a nanoparticles sampling apparatus and a cap that fits onto the base and that with the base defines a tunnel having an inlet open to the outside and an outlet that can be fitted with a fluidtight seal to a suction inlet of the sampling apparatus;
  a filtration assembly as explained hereinabove, sandwiched between the base and the cap;
  a first seal positioned so that it extends simultaneously against said faces so as to close off a passage between the annular support and the cover, and a second seal positioned against the cover so as to close off a passage between the base and the cap.

According to one particular embodiment of the invention, the two seals are flat seals positioned one either side of the filtration assembly before it is sandwiched between the base and the cap.

According to one particular embodiment of the invention, the skirt ends in a reinforcement able to allow the cover to be clip-fastened onto the annular support when the cover is attached to the annular support. Thus, the filtration assembly can easily be handled by being held by the skirt, without the risk of this skirt sliding the annular support.

DESCRIPTION OF THE FIGURES

The invention will be better understood in the light of the following description of one particular exemplary embodiment of the invention, given with reference to the attached drawings among which.

DETAILED DESCRIPTION OF PARTICULAR EMBODIMENTS OF THE INVENTION

Figure 1:
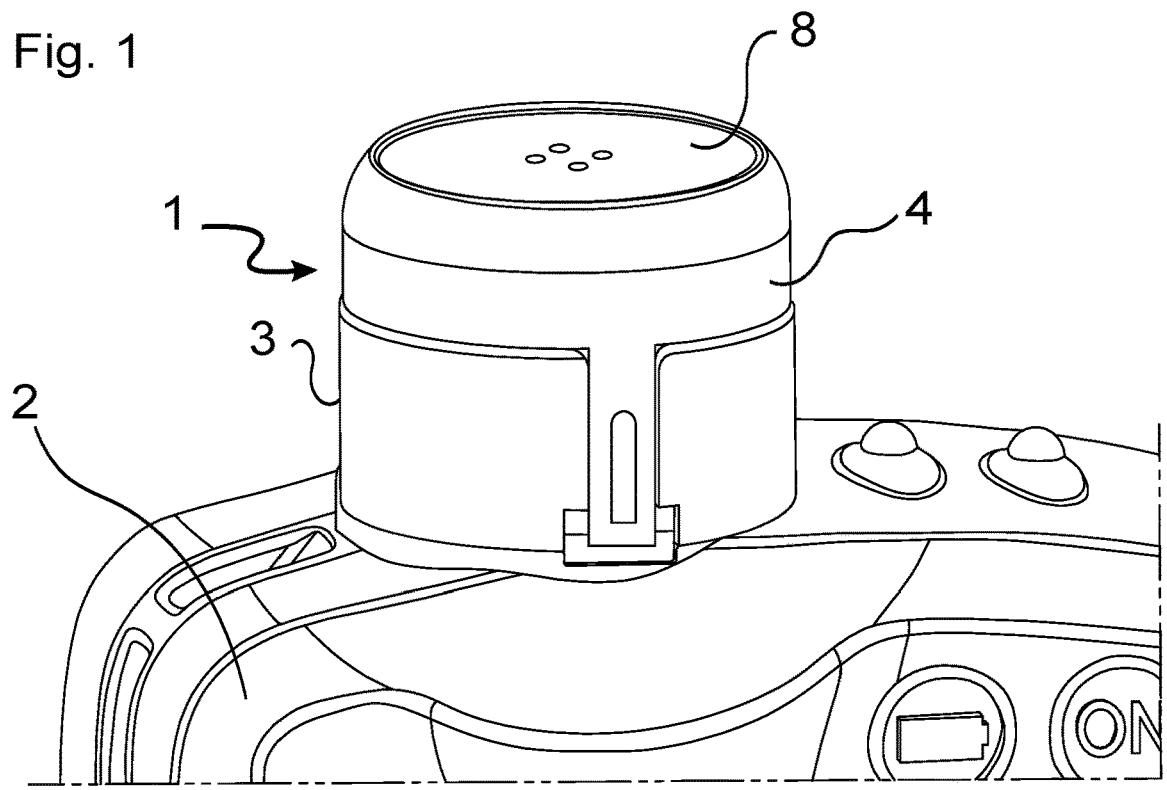
FIG. 1 is a partial perspective view of a sampling apparatus equipped with a removable cassette.
Figure 2:
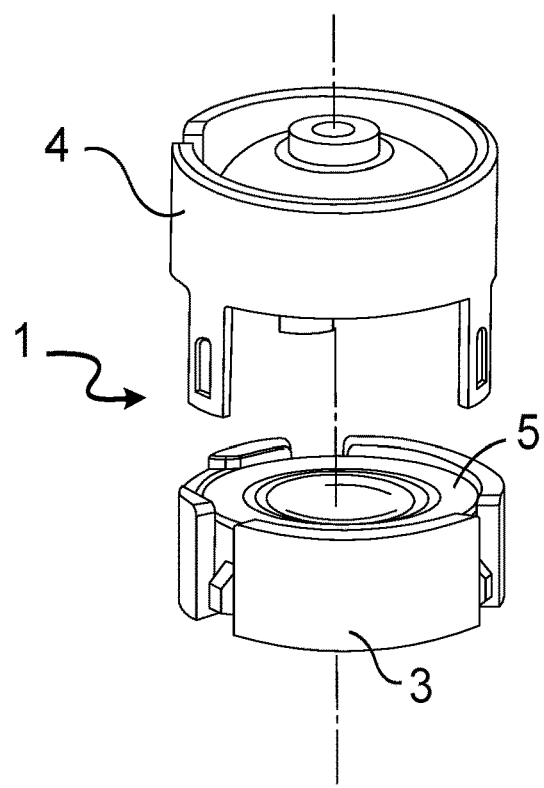
FIG. 2 is an exploded perspective view of a removable cassette according to the invention.
Figure 3:
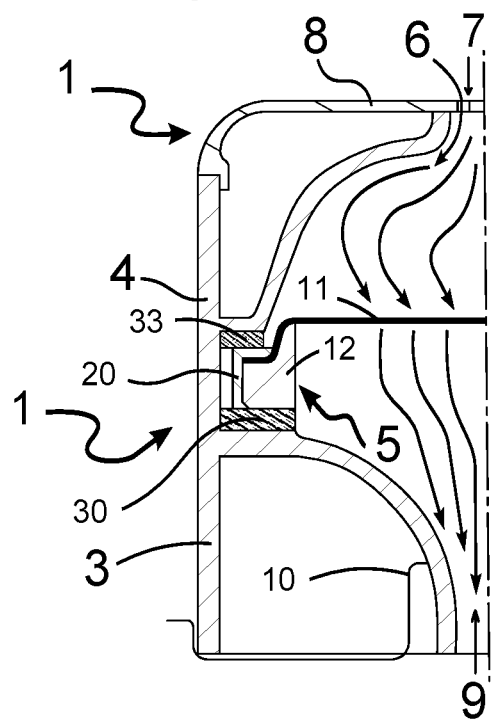
FIG. 3 is a view in part section of the removable cassette of FIG. 2.
Figure 4:
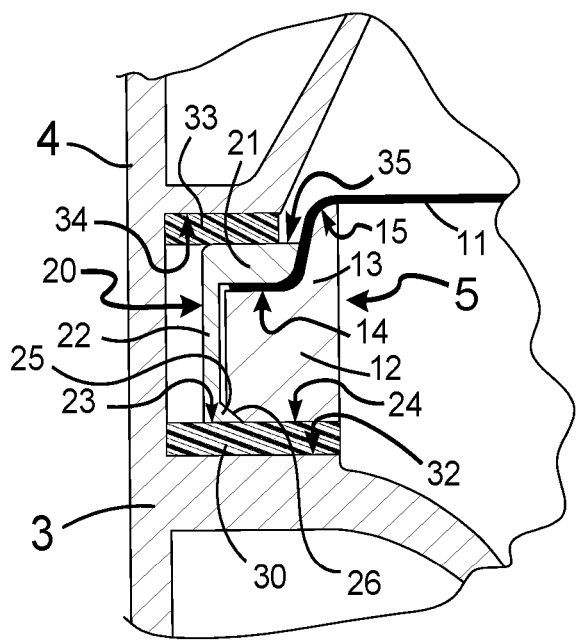
FIG. 4 is an enlarged view of FIG. 3.
Figure 5:
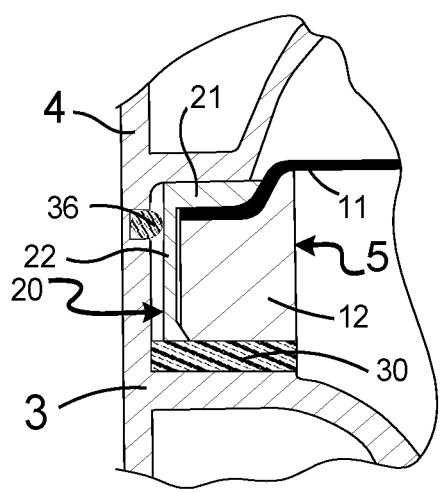
FIG. 5 is a view similar to FIG. 4 of an alternative form of embodiment of the cassette of the invention.
Figure 6:
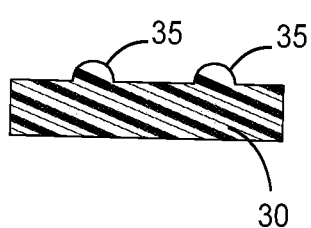
FIG. 6 is a cross section through a first seal that can be used in the cassettes of FIGS. 2 to 5.

With reference to FIG. 1 and as is known per se, the invention is aimed more particularly at a removable cassette 1 that can be fitted to a sampling apparatus 2 equipped with suction means for sucking an aerosol through a tunnel formed in the cassette 1. As illustrated in FIG. 2, the removable cassette 1 comprises a base 3 to which a cap 4 is attached (in this instance by clip-fastening) so that these between them trap a filtration assembly 5.

As illustrated in FIGS. 3 and 4, the base 3 and the cap 4 exhibit symmetry of revolution and internally define a tunnel 6 which extends from an inlet 7 protected by a guard 8 which has a hole at the inlet 7 as far as an outlet 9 which fits into an inlet 10 of the suction means of the sampling apparatus 2. The tunnel 6 is completely barred by a filter membrane 11 of the filtration assembly 5. Thus, the aerosol sucked in by the sampling apparatus enters the tunnel 6 via the inlet 7 and emerges via the outlet 9 having passed through the filter membrane 11 which retains the nanoparticles in suspension in the sucked-in aerosol. The removable cassette 1 is attached by any known means (clip-fastening, screwing, etc.) that allows it to be removed so that the nanoparticles captured and retained by the filter membrane 11 can be analyzed. All of this is perfectly well known and is recalled only to illustrate the invention.

The filtration assembly 5 comprises an annular support 12, for example made of polyamide, which comprises an annular step 13 which projects from a planar face 14 of the annular support 12 to exhibit an apex 15 on which the filter membrane 11 can rest. The filter membrane 11 extends beyond the apex 15 so as to rest on the planar face 14. The annular support 12 is covered by a cover 20, for example made of polycarbonate, which comprises a ring 21 attached to the annular support 12 to sandwich the filter membrane 11 between the ring 21 and the external face of the step 13. For that purpose, the cover 20 is force-fitted so as to sandwich the filter membrane 11 and pull it taut so that it then forms a planar surface suitable for subsequent analysis. The ring 21 also traps a peripheral part of the filter membrane 11 resting on the planar face 14 of the annular support 12. According to the invention, the ring 21 is extended by a skirt 22, here formed of one material with the ring 21, which extends in such a way as to cover a peripheral face of the annular support 12 and extends as far as an end face 23 which extends in the continuation of a bearing face 24 of the annular support, on the opposite side to the planar face 14 on which the filter membrane 11 rests.

In this instance, the skirt 22 ends in a peripheral reinforcement 25 exhibiting a slight undercut that collaborates with a chamfered part 26 of the annular support 12 to allow the cover 20 to be clip-fastened onto the annular support 12 when the filtration assembly 5 is being fitted. During fitting, the reinforcement 25 has to be forced around the peripheral face of the support 12 and the cover 20 has to be slid around the annular support 12 until the reinforcement 25 clips around the chamfered part 26 of the annular support 12. For preference, the clip-fastening causes the ring 21 to press against the bearing face 14 of the annular support. The assembly can therefore be handled easily, holding it by the skirt 22, for example using the gripper of a robot arm.

When the filtration assembly 5 is being fitted in the removable cassette 1, a first seal 30, in this instance a flat seal made of elastomer, is interposed and extends firstly against a planar face 32 of the base 3 and secondly and at the same time against the end face 23 of the skirt 22 and against the bearing face 24 of the annular support 12. The first seal 30 closes any passage that might be between the annular support 12 and the cover 20, thus preventing the membrane 11 from being bypassed using this passage.

Furthermore, a second seal 33, in this instance a flat seal made of elastomer, is interposed and extends against a planar face 34 of the cap 4 and a bearing face 35 of the ring 21. The second seal 32 eliminates any possibility of aerosol sucked up via a space between the base 3 and the cap 4 from being able to combine with the aerosol sucked up via the inlet 7 of the tunnel 6.

The seals are of course squashed when the cap 4 is clip-fastened onto the base 3. As an alternative illustrated in FIG. 5, the second seal 33 in this instance is replaced by an O ring seal 36 housed in an annular groove of the cap 4 so that it bears against an external face of the skirt 22. This O ring seal has the same effect as the flat seal that it replaces.

The invention is not restricted to that which has just been described but rather encompasses any alternative form that falls within the scope defined by the claims.

In particular, although in the examples illustrated the removable cassettes are provided with a second seal, the latter may be omitted if the base and the cap are designed so that, when assembled with one another, they obstruct in a sealed manner any passage between them, for example via the interposition of a seal between these two elements.

Although in the examples illustrated the skirt is formed of one material with the ring, a two-part cover may be anticipated. In particular, the skirt could be made from a softer material than the ring, making it easier to clip-fasten onto the annular support. In that regard, although here the clip-fastening means for clip-fastening the skirt onto the annular support comprise an end reinforcement with an undercut of the skirt collaborating with a chamfered part of the annular support, any other clip-fastening means, preferably ones which cause the ring to be pressed against the face of the annular support against which the filter membrane 11 presses may be provided.

Finally, the seals used may be of any possible shape. In particular, as illustrated in FIG. 6, the first seal 30 may have annular bulges 35 pressing respectively against the end face of the skirt and the bearing face of the annular support.

The invention claimed is:

1. A removable cassette for an apparatus for sampling nanoparticles, comprising a base configured to be fitted removably onto the filtration apparatus, and a cap attached to the base to trap a filtration assembly for halting and retaining nanoparticles in suspension in the filtration apparatus passing through the filtration assembly, the filtration assembly comprising an annular support which comprises an annular step having an apex on which a filter membrane rests, and a cover covering the annular support to hold a periphery of the membrane between the cover and the annular support, wherein the cover comprises a ring that can be slipped around the step to sandwich the periphery of the membrane between the ring and the annular support, the ring being extended by a skirt which projects out from the ring to cover an external peripheral wall of the annular support and to have an end face which extends in continuity with a bearing face of the annular support.

2. The removable cassette as claimed in claim 1, comprising a first seal positioned between the base and the filtration assembly to extend simultaneously against the end face of the skirt and the bearing face of the annular support.

3. The removable cassette as claimed in claim 2, in which the first seal is a flat seal made of elastomer.

4. The removable cassette as claimed in claim 1, comprising a second seal positioned between the cap and the cover of the filtration assembly.

5. The removable cassette as claimed in claim 4, in which the second seal is a flat seal made of elastomer positioned in such a way as to bear against a flat face of the ring of the cover.

6. The removable cassette as claimed in claim 4, in which the second seal is an O ring seal positioned in such a way as to bear against an external face of the skirt of the cover.

7. The removable cassette as claimed in claim 1, in which the ring and the skirt of the cover are formed of one material.

8. The removable cassette as claimed in claim 1, in which the skirt ends in means for clip-fastening onto the annular support.

9. The filtration assembly as claimed in claim 8, in which the means for clip-fastening comprises an annular reinforcement having an undercut configured to collaborate with a chamfered part of the annular support.

* * * * *